United States Patent

Odaka

[11] 3,886,883
[45] June 3, 1975

[54] APPARATUS FOR DISPOSING LONGITUDINALS FOR CONSTRUCTING HULL BLOCKS

[75] Inventor: Minoru Odaka, Ichiharashi, Japan

[73] Assignee: Mitsui Shipbuilding and Engineering Co. Ltd., Tokyo, Japan

[22] Filed: Apr. 9, 1974

[21] Appl. No.: 459,286

[30] Foreign Application Priority Data
Apr. 10, 1973  Japan.................... 48-40535

[52] U.S. Cl..................... 114/65 R; 29/200 P
[51] Int. Cl..................... B63b 3/18
[58] Field of Search......... 214/1 R, 38 CA, 38 C; 114/65 R; 29/200 R, 200 A, 200 J, 200 P

[56] References Cited
UNITED STATES PATENTS

| | | |
|---|---|---|
| 3,609,843 | 10/1971 | Fiegel, Jr. et al............ 29/200 P X |
| 3,708,100 | 1/1973 | Buchfuhrer et al............. 114/65 X |
| 3,747,184 | 7/1973 | Zaiss............................ 29/200 P |
| 3,759,207 | 9/1973 | Terai............................ 114/65 R |
| 3,802,045 | 4/1974 | Watanabe.................. 29/200 A X |

FOREIGN PATENTS OR APPLICATIONS
424,632  5/1967  Switzerland................ 214/38.42

Primary Examiner—Frank E. Werner
Attorney, Agent, or Firm—Dorfman, Herrell and Skillman

[57] ABSTRACT

Apparatus for disposing longitudinals for constructing hull blocks characterized in that a plurality of traveling pallets are provided on supports, the traveling pallets can be positioned in closed and expanded arrangement, a plurality of longitudinals are transported by pallets suspended from a crane and put on closely arranged traveling pallets, and the traveling pallets are expanded and longitudinals on the pallets are received and held by assembling jig by relative vertical movement of traveling pallets and jigs.

1 Claim, 7 Drawing Figures

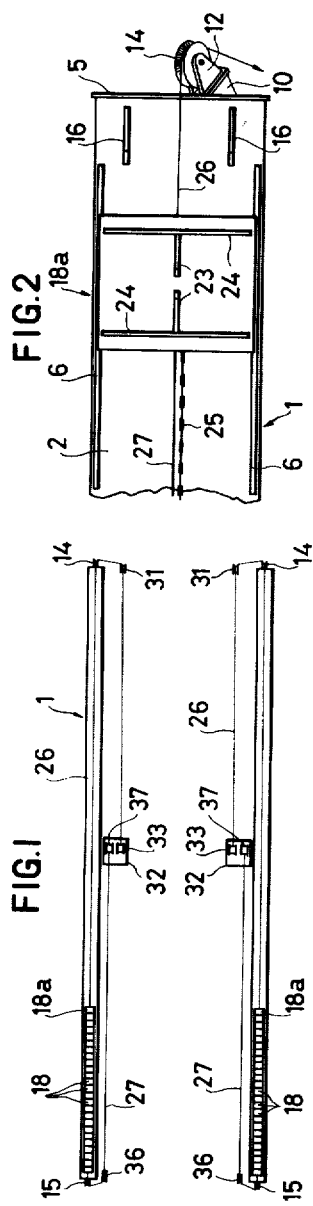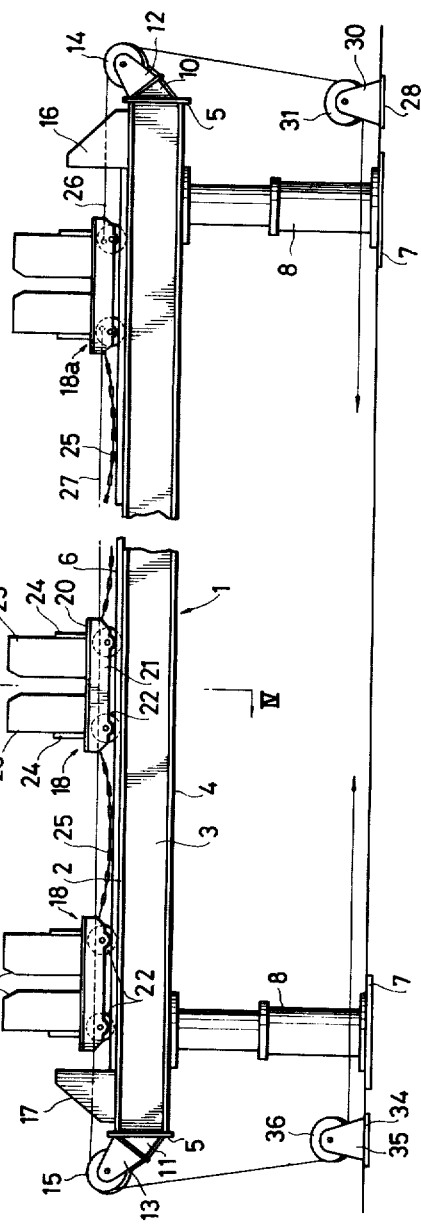

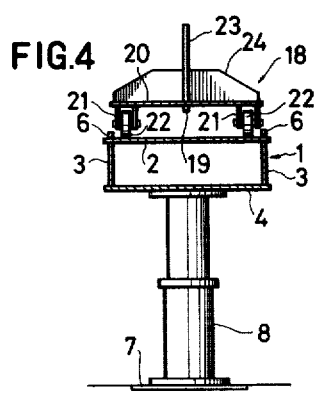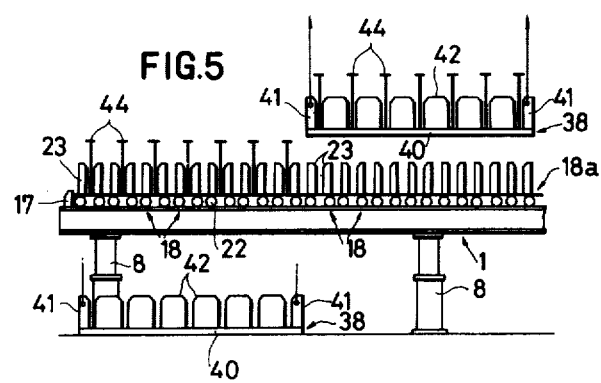

APPARATUS FOR DISPOSING LONGITUDINALS FOR CONSTRUCTING HULL BLOCKS

The present invention relates to an apparatus for disposing longitudinals for constructing hull blocks.

In the prior art, a plurality of longitudinals are transferred one by one and disposed on the predetermined positions for welding to transverses. Accordingly, in this method much time is required for completing the disposition of longitudinals.

The object of the present invention is to provide an apparatus by which the disposition of longitudinals for assembling the hull block may be efficiently performed in a short time.

Other objects and advantages of the present invention will become apparent from the following description with reference to the accompanying drawings, in which:

FIG. 1 is a plan view of an apparatus constituting an apparatus according to the present invention;

FIG. 2 is an enlarged plan view of a part of the apparatus shown in FIG. 1;

FIG. 3 is a side view of the apparatus;

FIG. 4 is a sectional view taken along line IV—IV in FIG. 3;

FIG. 5 is a side view of the apparatus showing an operating condition where longitudinals are put on the apparatus.

Figure 6:
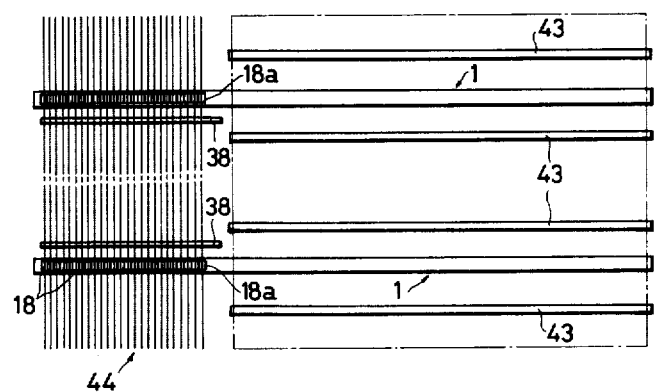
FIGS. 6 and 7 are plan views showing entire apparatus in operating condition.

Referring now to the drawings and more particularly to FIGS. 1 to 4, a pair of supports 1 are parallely provided on the ground. Each support comprises a top plate 2 having a pair of guide rails 6, side plates 3 and bottom plate 4 and is supported by oil hydraulic cylinders 8 on base plates 7. On both ends of each support 1, sheaves 14 and 15 are pivotally provided on projections 10 and 11 by brackets 12 and 13 respectively. Stoppers 16 and 17 are also provided on the support 1 near at both ends thereof. A plurality of traveling pallets 18 are mounted on the support 1 each of which has wheels 22 rotatably provided in the frame 21 by wheel shafts so that each pallet can be moved on the top plate 2. On the traveling pallet 18, a pair of holding plates 23 parallel to the moving direction of the pallet are secured with reinforcement of back up plates 24 between which a longitudinal may be held. These pallets are connected each other by chains 25 connected to hooks 19. The end pallet 18a is connected to a drum 33 of winch 32 by a wire rope 26 passing through the sheave 14 and sheave 31 provided on the bracket 30 on the base plate 28. The other end pallet is also connected to the drum 37 of the winch 32 by a wire rope 27 passing through the sheave 15 and sheave 36 provided on the bracket 35 on the base plate 34.

Referring to FIG. 5, a transporting pallet 38 for transporting a plurality of longitudinals comprises a base frame 40, end holding plates 41 and a plurality of holding plates 42. Longitudinals 44 may be inserted and held between holding plates. The holding plates are so arranged as to be spaced at a distance equal to the distance between holding plates 23 of traveling pallets 18 when all pallets 18 are closely arranged at a left portion of the support 1 as shown in FIG. 5.

Figure 7:
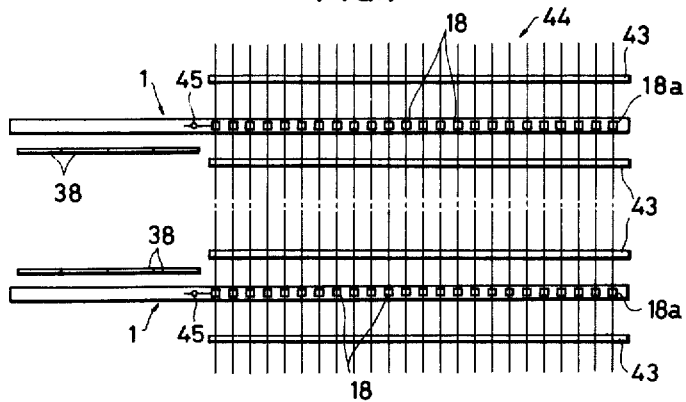

Referring to FIGS. 6 and 7, at a right portion of supports 1, jigs 43 for assembling and welding longitudinals and transverses are arranged parallely to supports.

Each jig 43 comprises a plurality of holding plates similar to the holding plates 42 for holding longitudinals and hydraulic cylinder means (not shown) for lifting and lowering thereof.

In operation, at the first, each support 1 is lifted by the hydraulic cylinders 8 and longitudinals 44 are held by a pair of pallets 38 and transported to the position above closely arranged support 1 by using a crane as shown in FIG. 5. Then the pallets are lowered below the supports 1 so that each longitudinal is engaged with the pallets 18 and held by holding plates 23. This operation is repeated so that all longitudinals are supported by the holding plates 23 as shown in FIG. 6. Thereafter winches 32 are operated to move the traveling pallets 18 to the right portion of the support 1. More particularly, each end pallet 18a is extracted by wire rope 26, which in turn extracts subsequent pallets. When each end pallet 18a is abutted to the stopper 16, all pallets are arranged in the expanded position at the right portion of the supports 1 as shown in FIG. 7. When some supports run over the desired position by inertia, the left end pallet is moved to the left by lever means 45 to position each pallet in place. Thus all longitudinals are positioned to correspond to the space between holding plates on jigs 43. Thereafter, all jigs 43 are lifted by hydraulic cylinder means to receive longitudinals from the pallets 18. The longitudinals are disposed and held by holding plates of the jigs 43 at predetermined position where welded to transverses. Supports 1 are lowered by hydraulic cylinders 8 and all pallets 18 are moved to the left ends of supports 1, where supports are lifted again by hydraulic cylinders 8 for next disposing of longitudinals.

In the above mentioned embodiment, although the support 1 and jig 43 are provided with the hydraulic cylinder means as the cylinder 8, the hydraulic cylinder may be provided in either device. Because, if either device is lifted or lowered, longitudinals on pallets 18 can be received by jigs 43.

From the foregoing it will be understood that a plurality of longitudinals can be disposed in a short time in accordance with the present invention.

What is claimed is:

1. An apparatus for disposing longitudinals for constructing hull blocks comprising supports each of which having guide rails on the top thereof, traveling pallets provided on said supports, each pallet having a pair of holding plates for holding a longitudinal and being connected to adjacent pallets by flexible connecting means for keeping a predetermined distance between pallets, driving means for moving said pallets, a crane, transporting pallets suspended from said crane for transporting longitudinals to said traveling pallets and for transferring them onto the traveling pallets, each transporting pallet having a plurality of holding plates for holding longitudinals arranged in a manner such that longitudinals held by the holding plates can be received by said traveling pallets while said pallets are closely arranged on said supports, parallel jigs mounted to said supports for receiving and holding longitudinals after said traveling pallets have been moved to a spaced-apart position, and means for assembling said longitudinals to transverses, and means for lifting and lowering either the said supports or the jigs to effect a transfer thereto.

* * * * *